3,044,941
PROCESS FOR PRODUCING ITACONIC ACID
Robert C. Nubel, Wantagh, and Edwin J. Ratajak, Roslyn, N.Y., assignors to Chas. Pfizer & Co., Inc., New York, N.Y., a corporation of Delaware
No Drawing. Filed Apr. 26, 1960, Ser. No. 24,662
8 Claims. (Cl. 195—36)

This application relates to a new and improved process for the production of itaconic acid and its salts.

As is well known, itaconic acid is a valuable substance which has broad utility in the polymer field and in other areas, and its production by fermentation has been widely studied. Early workers found that various species of Aspergillus, including strains of *A. terreus* and *A. itaconicus*, were capable of producing itaconic acid by surface fermentation of carbohydrates. A significant advance was made when a submerged aerobic fermentation process was discovered, as described in U.S. Patent 2,385,283. With these processes, yields of from about 10 to about 30% by weight of the carbohydrate were generally achieved, in fermentation periods usually ranging from about 7 to 14 days.

Since that time a number of reports have appeared in the literature describing efforts to reduce the cost of the process. Illustrative of these is the article appearing in Industrial and Engineering Chemistry, volume 44, pages 2975–80, 1952, describing the work of the Northern Regional Research Laboratory. Here it is reported that improved yields of itaconic acid may be obtained in reasonable time on 6% refined glucose media. The report states that several attempts were made to replace the refined glucose with less expensive carbohydrate sources, including cane and beet molasses. However, in these experiments no significant amounts of itaconic acid were produced. Further, when the sugar concentration was increased to 9–10%, over-all production rate and yield were low, and attempts to improve production rate in these more concentrated media were unsuccessful.

Other reports have appeared from time to time describing the production of itaconic acid from more concentrated solutions of refined sugars. These processes, however, have generally entailed prolonged fermentation time and have frequently provided reduced yields of product.

Clearly, for more economical production of itaconic acid it would be desirable to employ cheaper sources of carbohydrate, provided that high yields and high equipment capacity could be attained.

Accordingly, it is an object of the present invention to convert inexpensive carbohydrates to itaconic acid in high yield by submerged aerobic fermentation.

A further object is to provide such a fermentation which operates successfully at high carbohydrate concentrations.

Still another object is to provide such a fermentation which reaches maximum production in very short time.

These and other objects are now achieved by a novel submerged fermentation process comprising the use of specified proportions of beet molasses in the fermentation medium, as more fully described hereinafter. This process provides yields of 50 grams and more of itaconic acid per 100 grams of carbohydrate introduced, even where inexpensive molasses mixtures constitute the sole carbohydrate source. What is more surprising, these valuable advantages are achieved in remarkably short time and even when relatively concentrated carbohydrate solutions are employed. As a result, remarkable reductions in cost and gains in equipment capacity are possible.

The beet molasses employed in the fermentation medium of the new process is a well known, commercially available by-product of the recovery of sugar from sugar beets. It typically contains about 50% w./w. sugar, primarily sucrose. It is not possible, however, to achieve the advantages of the new process by merely employing an aqueous sucrose solution.

For best results, sufficient beet molasses is employed in the fermentation medium to furnish at least about 10% of the total carbohydrate, although some advantage may be achieved at even lower concentration. It will ordinarily be unnecessary to employ concentrations of beet molasses higher than the equivalent of about 30% of the total carbohydrate in the medium and, indeed, materially higher beet molasses concentrations sometimes lead to difficulty in recovering the itaconic acid produced. A particularly useful beet molasses concentration is that corresponding to from about 15 to about 25% of the total carbohydrate.

As the remainder of the carbohydrate, various mono- and disaccharides may be employed, including sucrose, glucose or fructose, or mixtures of such sugars as, for example, invert sugar. However, a particularly preferred carbohydrate source, because of its ready availability and low cost, is cane molasses. This is a well known product of commerce, sometimes known as crude cane molasses, or "high test" molasses. It is produced by the partial inversion of clarified, concentrated sugar cane juice and usually contains about 70–75% w./w. total sugars, of which about two-thirds is invert sugar and the remainder sucrose.

Thus it will be noted that in a preferred embodiment of the present invention the carbohydrate is derived exclusively from inexpensive molasses, both beet and cane. When we say molasses, we also include purified molasses, that is, molasses that has been subjected to any of the purification steps well known in the fermentation art, including treatment with such agents as activated carbon or clays, cation-exchange resins, ferrocyanide, lime, bentonite, and the like. Such treatments may sometimes exert a beneficial effect by removal of impurities, such as heavy metals or alkaline earth substances, from the molasses. However, they are by no means essential to achieving the advantages characteristic of the process of the present invention.

In formulating fermentation media for our new process the molasses or other sugars are diluted with water, and for optimum results a total sugar concentration ranging from about 10 to about 18% w./v. is generally preferred. Total sugar concentrations below 10% may also be utilized as in prior art processes, but there is ordinarily no advantage. For high production capacity the more concentrated solutions, such as 15–16% sugar, will naturally be preferred.

The beet molasses may be introduced into the production fermentation in several ways. Thus, it may be blended directly with the cane molasses or other carbohydrate in the formulation of the production medium as indicated hereinabove. However, a particularly convenient procedure employs the beet molasses as the primary carbohydrate source in the submerged aerobic growth of an inoculum with the microorganism selected. This inoculum may then be transferred to a cane molasses medium to initiate submerged, aerobic fermentation. If this procedure is selected, the separate beet and cane molasses concentrations will be selected to conform to the ranges previously described, and sufficient inoculum will be added to the production medium to provide beet molasses equivalent to from about 10 to about 30% of the total carbohydrate. Thus, for example, about 20 volume percent of a beet molasses inoculum may be introduced into a cane molasses medium of equivalent concentration to provide a desirable proportion of beet molasses in the production fermentation.

In addition to the carbohydrate, other ingredients, well known to those skilled in the art, may also be included in the inoculum and fermentation media. For example, it is often beneficial to provide various salts such as magnesium, zinc and copper salts in minor concentration. These may be present as impurities in other components or may be added separately. In addition, sources of nitrogen, such as nitrates, ammonium salts, urea, amino acids and the like may be included, but this will usually be unnecessary. If foaming is excessive, a trace of an antifoam agent such as soybean oil may be incorporated.

The microorganisms which are suitably employed in the process of the present invention are the mycetes, especially the itaconic-acid-producing strains of Aspergillus, including such strains of *A. itaconicus*, and preferably, of *A. terreus*. A number of such organisms are known and available. For example, *A. terreus* NRRL 1960 and NRRL 265 are available from the culture collection of the Northern Regional Research Laboratory in Peoria, Illinois. The present invention also embraces itaconic-acid-producing mutants of such microorganisms, obtained by various means such as X-radiation, ultraviolet radiation, treatment with nitrogen mustards, and other processes already known in the art.

After sterilization of the medium by heat or other means, it may be inoculated with the selected organism, suitably by transfer of spores from an agar slant or from surface pad growth, or preferably, by addition of previously prepared inoculum. If the latter procedure is followed the pH will usually drop to a value between about 4 and about 5.5. Should it be lower, it is sometimes desirable to adjust it with alkali to a value within this range.

Following inoculation, submerged aerobic propagation may be conveniently conducted in standard fermentation vessels, equipped with means for agitation and for introduction of air beneath the liquid surface. For best results, it has been found desirable to employ a relatively high fermentation temperature, between about 35 and about 42° C. An aeration rate of about ¼–½ volume of air per volume of medium per minute is desirable, but higher rates, up to about 2 volumes per volume per minute, may sometimes be advantageously employed. These conditions are suitable for both inoculum growth and production fermentation.

The optimum fermentation time will naturally vary somewhat, depending on the particular organism, temperature, and other conditions selected. If an inoculum is prepared on beet molasses and then transferred to the production medium, periods of about 18 to 24 hours are usually appropriate for the inoculum growth, and production fermentation is usually substantially complete in the surprisingly short period of about 2½ to 3½ days.

It has been found particularly advantageous, although not essential, to neutralize a portion of the formed itaconic acid during the production fermentation. This may be accomplished by addition of a base such as lime, ammonia, or potassium or sodium hydroxide. Lime is usually preferred. The partial neutralization is best conducted when the itaconic acid content of the broth has risen to a value of from about 2 to about 5 grams per 100 ml., preferably 2.5–4.5 grams. This will usually be about 18 to 48 hours after inoculation. Sufficient base is added to neutralize from about 20 to about 50% of the itaconic acid which has been produced. After this adjustment, the fermentation is permitted to proceed under the same conditions of temperature and aeration as before until the rate of production of itaconic acid becomes negligible.

The progress of the fermentation is conveniently followed by withdrawing samples periodically and determining the itaconic acid content of the broth. Standard assays are available and well known to those skilled in the art. One suitable procedure, for example, involves filtration and acidification of the filtrate, followed by solvent extraction and titration with bromine. Yields of 50 grams or more of itaconic acid per 100 grams of carbohydrate charged are provided by the new process. It should be noted that this method of reporting yields is a more desirable one than others occasionally used. For example, it has sometimes been the practice to report a yield in terms of the final concentration of itaconic acid as a percent of the initial carbohydrate concentration. The latter method frequently leads to erroneously high results, particularly in small scale experiments at high aeration rates, where appreciable evaporation may occur.

Recovery of the product is readily conducted by standard, well known procedures. For example, the product may be isolated from the filtered broth by concentration, cooling and crystallization. Alternatively, the itaconic acid may be adsorbed from the filtered broth on an anion exchange resin and eluted with aqueous base. Recovery is particularly trouble-free as a result of the high broth potencies provided by the process of the present invention.

From the foregoing description, it will be clear that the use of the specified levels of beet molasses provides a number of totally unexpected advantages. Fermentation time is reduced as much as 60–80%, even with highly concentrated carbohydrate solutions, thereby substantially increasing equipment capacity. In addition, conversion to product is doubled over the results achieved with many prior art processes. Recovery of itaconic acid from the resulting highly concentrated itaconic acid broths is appreciably simplified. Above all, these important advantages are attained even where all carbohydrate is furnished by beet and cane molasses, at a substantial saving in raw material costs.

The following examples are provided by way of illustration and should not be interpreted as limiting the invention, many variations of which are possible without departing from the spirit or scope thereof.

*Example 1*

| | |
|---|---|
| Beet molasses diluted with water to 15% w./v. sugar _____ ml__ | 2000 |
| $ZnSO_4$, 50% w./v. aq. soln_____ ml__ | 6 |
| $MgSO_4 \cdot 7H_2O$ _____ gm__ | 10 |
| $CuSO_4 \cdot 5H_2O$ _____ gm__ | 0.04 |
| Soybean oil_____ ml__ | 0.5 |

The above inoculum medium, having a pH of about 7.6, is sterilized at 100° C. for 30 minutes, permitted to cool to about 35° C. and inoculated with 5 ml. of a spore suspension of a strain of *A. terreus* from surface pad growth. Submerged growth is conducted in a standard 2-liter fermenter equipped with a high-speed propeller stirrer. Agitation, and aeration at the rate of 500 ml. air per minute, are continued for a total of 18 hours at a temperature of about 33–37° C. At this time the pH has dropped to a value of about 4.5.

| | |
|---|---|
| Cane molasses diluted with water to 15% w./v. sugar _____ ml__ | 2000 |
| $ZnSO_4$, 50% w./v. aq. soln_____ ml__ | 4 |
| $MgSO_4 \cdot 7H_2O$ _____ gm__ | 6 |
| $CuSO_4 \cdot 5H_2O$ _____ gm__ | 0.02 |

The above production medium is sterilized at 100° C. for 45 minutes, followed by autoclaving for 5 minutes at 15 p.s.i.g. steam pressure. After cooling to 40° C., 400 ml. of inoculum prepared as described above is added, and submerged aerobic fermentation is permitted to proceed with high speed agitation. Throughout the fermentation the temperature is maintained at about 39–42° C. and air is introduced below the surface at a rate of about 500–1000 ml. per minute. The pH, initially about 5.1, gradually drops to about 3.1 after 24 hours, and broth assay shows an itaconic acid content of about 4 grams per 100 ml.

At this point the pH is adjusted to about 3.8 by the addition of a half equivalent of lime, and fermentation is permitted to proceed for an additional 48 hours at 40° C., with aeration and agitation as before. The broth is then found to contain about 170 grams of itaconic acid, and is substantially free from other organic acids. The product may be recovered in salt or acid form by concentrating at suitable pH, cooling and crystallizing. Further purification may be achieved, if desired, by recrystallization from water or other solvents.

*Example II*

The procedure of Example I is repeated, substituting *A. itaconicus* for the *A. terreus*, and itaconic acid is again produced in excellent yield.

*Example III*

|  | Ml. |
|---|---|
| Beet molasses diluted to 18% w./v. sugar | 200 |
| Cane molasses diluted to 18% w./v. sugar | 1800 |

The listed ingredients are combined, heat-sterilized, and inoculated with a suspension of *A. terreus* spores. Submerged fermentation is then permitted to proceed at 35–40° C. while supplying air at the rate of 1 liter per minute until an itaconic acid concentration of about 5 grams per 100 ml. is reached. At this point 20% of the acid is neutralized by addition of lime and fermentation is continued as before until successive assays indicate a negligible rate of product formation. The broth is filtered and concentrated to crystallize the product in high yield.

*Example IV*

|  | Ml. |
|---|---|
| Beet molasses diluted to 10% w./v. sugar | 600 |
| Glucose, 10% w./v. aqueous solution | 1400 |

The combined sterile medium is inoculated with *A. terreus* spores and submerged aerobic fermentation conducted at 40–41° C. until 2 grams of itaconic acid per 100 ml. have been produced. Sufficient ammonia is added to neutralize half of the acid and fermentation is continued as before to produce itaconic acid in high yield.

*Example V*

|  | Ml. |
|---|---|
| Beet molasses diluted to 15% w./v. sugar | 600 |
| Fructose, 15% w./v. aqueous solution | 1400 |

The combined sterile medium is inoculated with *A. terreus* spores and submerged aerobic fermentation is conducted at 40–41° C. until the rate of itaconic acid production becomes negligible. The product is recovered as before in good yield.

What is claimed is:

1. In the process of producing a substance selected from the group consisting of itaconic acid and its salts by submerged aerobic fermentation of an itaconic-acid-producing Aspergillus in a carbohydrate solution, the improvement which comprises conducting the fermentation in the presence of beet molasses as the source of from about 10 to about 30% of said carbohydrate.

2. A process as in claim 1 wherein the itaconic acid is partially neutralized during the fermentation.

3. A process as in claim 1 wherein said fermentation is conducted at a temperature in the range of from about 35 to about 42° C.

4. A process for the production of a substance selected from the group consisting of itaconic acid and its salts which comprises inoculating a molasses solution containing beet molasses as the source of from about 10 to about 30% of said carbohydrate with an itaconic-acid-producing Aspergillus, permitting said solution to ferment under submerged aerobic conditions at a temperature ranging from about 35 to about 42° C. until the itaconic acid concentration reaches a level of from about 2 to about 5 grams per 100 ml., neutralizing from about 20 to about 50% of the produced acid, and permitting said submerged aerobic fermentation to proceed as before until the rate of itaconic acid production becomes negligible.

5. A process as in claim 4 wherein said microorganism is an itaconic-acid-producing strain of *Aspergillus terreus*.

6. A process as in claim 4 wherein said microorganism is an itaconic-acid-producing strain of *Aspergillus itaconicus*.

7. A process as in claim 4 wherein said beet molasses is employed as the primary carbohydrate source in growing an inoculum which is then transferred to a cane molasses medium for production fermentation.

8. A process as in claim 7 wherein said molasses solutions initially contain from about 10 to about 18% w./v. total sugar.

References Cited in the file of this patent

UNITED STATES PATENTS

| 2,657,173 | Pfeifer et al. | Oct. 27, 1953 |
| 2,674,561 | Moyer | Apr. 6, 1954 |